United States Patent
Higashinakagawa et al.

(10) Patent No.: US 9,973,414 B2
(45) Date of Patent: May 15, 2018

(54) DEVICE AND METHOD FOR WIRELESS COMMUNICATION USED IN WIRELESS AD HOC NETWORK

(71) Applicant: FUJITSU LIMITED, Kawasaki-shi, Kanagawa (JP)

(72) Inventors: Takashi Higashinakagawa, Yokohama (JP); Katsumi Sakurai, Kamo (JP); Yuji Takahashi, Minato (JP); Tadashige Iwao, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 183 days.

(21) Appl. No.: 14/961,302

(22) Filed: Dec. 7, 2015

(65) Prior Publication Data
US 2016/0218966 A1 Jul. 28, 2016

(30) Foreign Application Priority Data
Jan. 27, 2015 (JP) .................... 2015-013420

(51) Int. Cl.
*H04L 12/705* (2013.01)
*H04L 12/733* (2013.01)
(Continued)

(52) U.S. Cl.
CPC .............. *H04L 45/20* (2013.01); *H04L 45/18* (2013.01); *H04W 40/02* (2013.01); *H04W 84/18* (2013.01)

(58) Field of Classification Search
CPC ........ H04L 45/18; H04L 45/20; H04W 84/18; H04W 40/02
See application file for complete search history.

(56) References Cited

U.S. PATENT DOCUMENTS

| | | | |
|---|---|---|---|
| 6,456,597 B1 * | 9/2002 | Bare | .................. H04L 29/12009 370/252 |
| 2003/0179707 A1 * | 9/2003 | Bare | ..................... H04L 12/185 370/235 |

(Continued)

FOREIGN PATENT DOCUMENTS

| | | |
|---|---|---|
| JP | 2009-514265 | 4/2009 |
| WO | 2007/049826 | 5/2007 |
| WO | 2011/013165 | 2/2011 |

OTHER PUBLICATIONS

Extended European Search Report dated Jun. 15, 2016 for corresponding European Patent Application No. 15198003.4, 6 pages.
(Continued)

*Primary Examiner* — Rina C Pancholi
(74) *Attorney, Agent, or Firm* — Fujitsu Patent Center

(57) ABSTRACT

A method executed by a wireless communication device used in a wireless ad hoc network includes: designating a bit in a loop detection array added to a received frame in accordance with identification information of the wireless communication device; deciding that a route in which the received frame has been transmitted is not a loop when the bit designated in the loop detection array is not used; deciding that the route is a loop when the bit designated in the loop detection array is used; updating the bit designated in the loop detection array to a state of being used and transmitting the received frame toward a destination node when it is decided that the route is not a loop; and returning the received frame to an adjacent node that is a local transmission source of the received frame when it is decided that the route is a loop.

7 Claims, 15 Drawing Sheets

(51) Int. Cl.
    *H04W 84/18*     (2009.01)
    *H04W 40/02*     (2009.01)

(56) References Cited

U.S. PATENT DOCUMENTS

| | | | | |
|---|---|---|---|---|
| 2004/0146007 | A1* | 7/2004 | Saadawi | H04L 45/08 370/238 |
| 2008/0062916 | A1* | 3/2008 | Mosko | H04L 45/18 370/328 |
| 2009/0238080 | A1* | 9/2009 | Hirano | H04L 12/4633 370/241 |
| 2011/0141932 | A1* | 6/2011 | Iwao | H04L 45/02 370/252 |
| 2012/0106552 | A1* | 5/2012 | Iwao | H04L 45/36 370/392 |
| 2014/0204728 | A1* | 7/2014 | Kobayashi | H04L 47/00 370/218 |

OTHER PUBLICATIONS

Hui, J. et al., "RPL Option for Carrying RPL Information in Data-Plane Datagrams", draft-ietf-6man-rpl-option-01, 6MAN, Internet-Draft, Intended status: Standards Track, Expires: Apr. 26, 2011, IETF, Standardworkingdraft, Internet Society, (ISOC) 4, Rue Des Falaises, CH-1205, No. 1, Oct. 23, 2010, pp. 1-16, XP015072087.

* cited by examiner

FIG. 2

| LD | LS | GD | GS | FID | TYPE | LH (HOP COUNT VALUE) | LB (LOOP DETECTION ARRAY) | LENGTH | PAYLOAD |
|----|----|----|----|-----|------|----------------------|---------------------------|--------|---------|

| DESTINATION (GD) | PRIORITY | ADJACENT NODE (LD) |
|---|---|---|
| N7 | 1 | N7 |
|  | 2 | N5 |
|  | 3 | N3 |
| N1 | 1 | N3 |
|  | 2 | N5 |
|  | 3 | N7 |
| ⋮ |  |  |

| FID | GS | LD | OLS | HOP | LAST UPDATE TIME |
|---|---|---|---|---|---|
| ⋮ | ⋮ | ⋮ | ⋮ | ⋮ | ⋮ |
| Fa | N1 | N2 | N1 | $LH_1$ | $TF_{101}$ |

F I G. 5

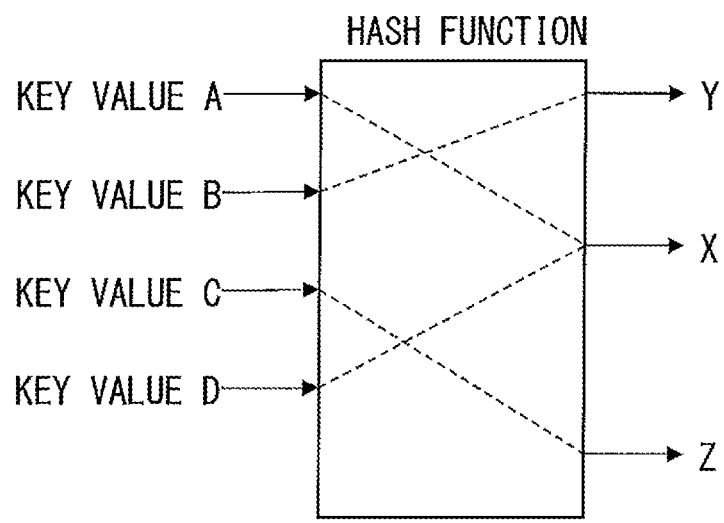
F I G. 7

| 0 | 0 | 0 | 0 | 0 | 0 | 0 | 0 |
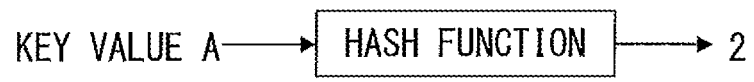
| 0 | 1 | 0 | 0 | 0 | 0 | 0 | 0 |
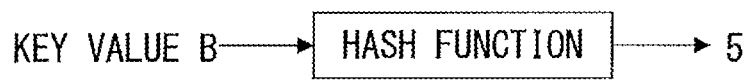
| 0 | 1 | 0 | 0 | 1 | 0 | 0 | 0 |
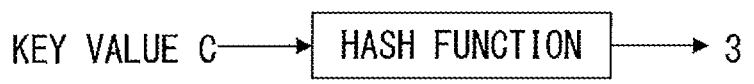
| 0 | 1 | 1 | 0 | 1 | 0 | 0 | 0 |
FIG. 8

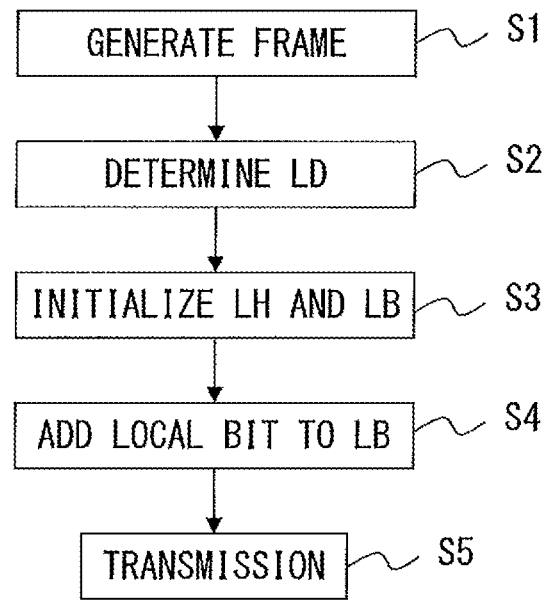
F I G. 1 0

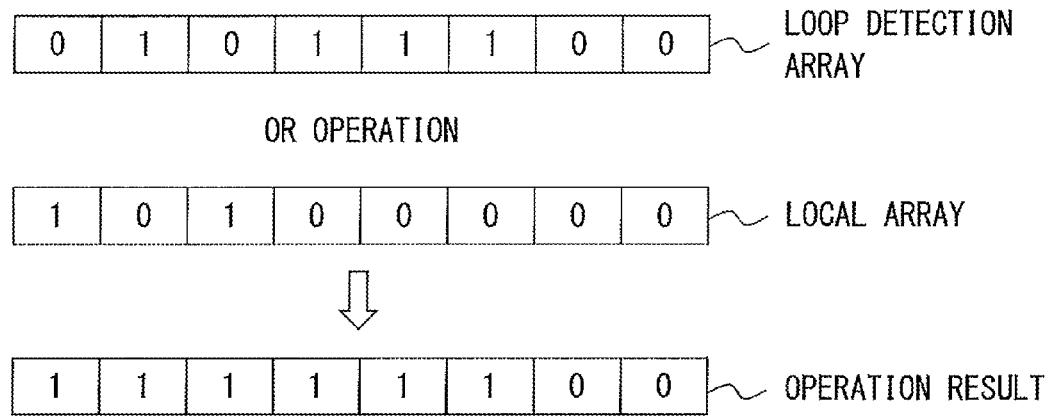
F I G. 13

DEVICE AND METHOD FOR WIRELESS COMMUNICATION USED IN WIRELESS AD HOC NETWORK

CROSS-REFERENCE TO RELATED APPLICATION

This application is based upon and claims the benefit of priority of the prior Japanese Patent Application No. 2015-013420, filed on Jan. 27, 2015, the entire contents of which are incorporated herein by reference.

FIELD

The embodiments discussed herein are related to a device and a method for wireless communications used in a wireless ad hoc network.

BACKGROUND

Wireless ad hoc networks, in which a wireless communication device is arranged in each of a plurality of locations and pieces of information are collected from the respective locations without a base station, have been put into practical use. In this type of system, a server computer for example can collect and analyze pieces of meteorological information that were measured in the respective locations.

In a wireless ad hoc network described above, a wireless communication device transmits to an adjacent node a frame to which a destination address (for example, the address of a server computer) is added. The wireless communication device that has received this frame forwards the frame in accordance with the destination address. For this forwarding, the wireless communication device selects an appropriate adjacent node from among a plurality of adjacent nodes in accordance with the destination address, and forwards the received frame to the selected adjacent node. In other words, each wireless communication device autonomously determines an adjacent node as a forwarding destination. Then, the frame transmitted from a source wireless communication device is forwarded to a node designated by the destination address (a server computer for example) via one or a plurality of wireless communication devices.

As described above, in a wireless ad hoc network system, a route in which a frame is forwarded from a source node to a destination node is determined autonomously by one or a plurality of wireless communication devices in the system. Accordingly, a situation may occur in which a frame transmitted from a node is returned to that node after passing through one or a plurality of nodes (which will be described as a "loop" hereinafter). When a loop is established, it sometimes may occur that a frame is not transmitted to the destination node.

In view of this, a method of detecting a loop in a wireless ad hoc network is proposed. For example, each wireless communication device keeps, in a memory for a certain period of time, a record of information for identifying a frame transmitted or forwarded by that wireless communication device itself. Then, for each received frame, the wireless communication device confirms whether or not the information for identifying that received frame is recorded in the memory. When the result indicates that the information for identifying the received frame is recorded in the memory, the wireless communication device decides that the transmission route of that frame is a loop. When a loop is detected, the wireless communication device transmits or forwards a frame by using a different route (for example, WO2011/013165). In addition to this method, a technique for detecting a loop is proposed (for example, Japanese National Publication of International Patent Application No. 2009-514265).

As described above, by using a memory that records information for identifying a transmitted frame or a forwarded frame, wireless communication devices can detect a loop. However, in order to detect a loop highly accurately by using this method, transmitted frames and forwarded frames need to be managed for a relatively long period of time. Therefore, each wireless communication device needs to be provided with a memory of a large capacity for making loop decision.

SUMMARY

According to an aspect of the embodiments, a non-transitory computer-readable recording medium having stored therein a program for causing a processor in a wireless communication device to execute a wireless communication process, the wireless communication device being used in a wireless ad hoc network, the wireless communication process includes: designating a bit in a loop detection array added to a received frame in accordance with identification information for identifying the wireless communication device; deciding that a route in which the received frame has been transmitted is not a loop when the bit designated in the loop detection array is not used; deciding that a route in which the received frame has been transmitted is a loop when the bit designated in the loop detection array is used; updating the bit designated in the loop detection array to a state of being used and transmitting the received frame toward a destination node when it is decided that the route in which the received frame has been transmitted is not a loop; and returning the received frame to an adjacent node that is a local transmission source of the received frame when it is decided that the route in which the received frame has been transmitted is a loop.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 illustrates an example of a format of a frame;

FIG. 5 illustrates an example of an FID management table;

FIG. 7 illustrates a feature of a hash function;

FIG. 8 illustrates an example of a process by a Bloom filter;

FIG. 10 is a flowchart illustrating an example of a process of a wireless communication device of a source node;

FIG. 13 illustrates an example of a method of updating a bit detection array;

DESCRIPTION OF EMBODIMENTS

Figure 1:
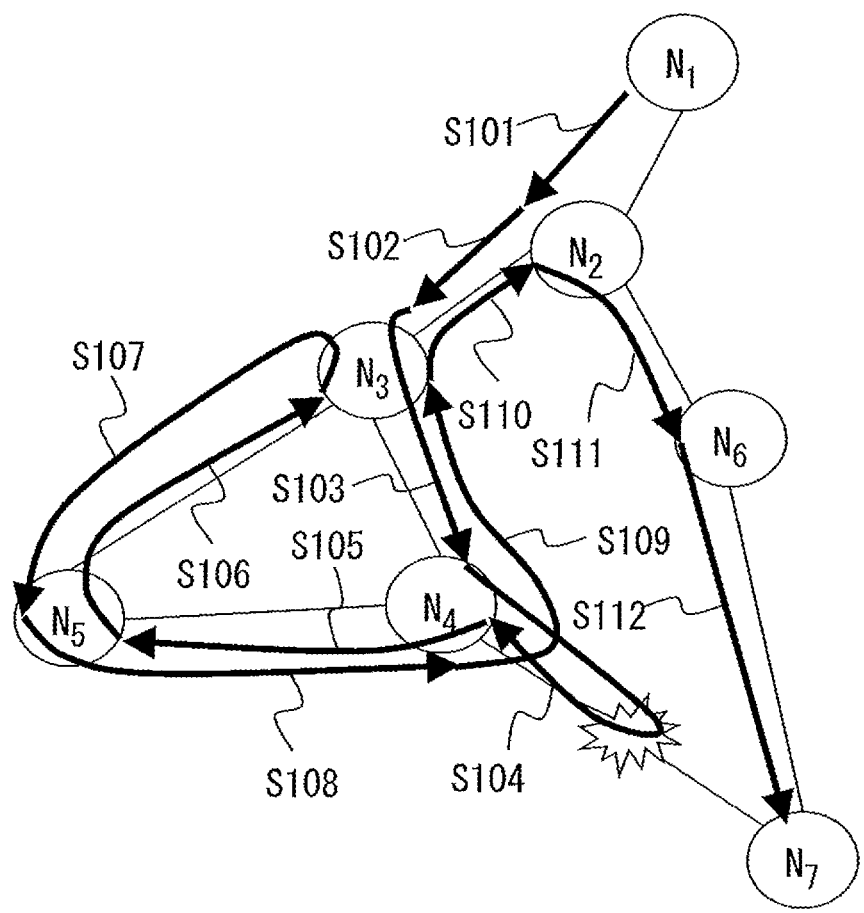
FIG. 1 illustrates an example of frame forwarding in a wireless ad hoc network.

FIG. 1 illustrates an example of frame forwarding in a wireless ad hoc network according to an embodiment of the present invention. In this example, the wireless ad hoc network includes nodes N1 through N7. Each node is provided with a wireless communication device. Note that, in the following descriptions, the wireless communication devices respectively provided to nodes N1 through N7 may be referred to as wireless communication devices N1 through N7. The solid lines connecting the nodes represent wireless links.

The wireless communication device can transmit a frame to an adjacent node. Also, the wireless communication device that has received a frame from an adjacent node can forward the received frame to a different adjacent node. For this forwarding, the wireless communication device determines an adjacent node to which that frame is to be transmitted or forwarded, in accordance with the destination of the frame. In other words, the route in which a frame is forwarded is autonomously determined by each wireless communication device in a wireless ad hoc network.

In the example illustrated in FIG. 1, the wireless communication device provided to node N1 (i.e., wireless communication device N1) generates a frame so as to transmit the frame to the destination. In this example, the destination of the frame is node N7. Note that in the following descriptions, a node in which a frame is generated may be referred to as a "source node (GS: Global source)". Also, the final destination of that frame may be referred to as a "destination node (GD: Global Destination)".

In S101 through S103, a frame generated in wireless communication device N1 is forwarded to node N4 by nodes N2 and N3. Wireless communication device N4 attempts to forward the received frame to node N7 in S104. However, the quality of the wireless link between nodes N4 and N7 is poor, and thus the frame forwarded from node N4 to node N7 does not reach node N7. In such a case, wireless communication device N4 does not receive an ACK frame from node N7, and thereby detects that the transmission of the frame to node N7 has failed. Then, wireless communication device N4 forwards the frame by using a different route.

In S105 and 106, the frame is forwarded from node N4 to node N3 via node N5. However, the frame that wireless communication device N3 receives from node N5 is a frame that wireless communication device N3 transmitted to node N4 previously. In such a case, wireless communication device N3 decides that the route in which the received frame has been transmitted is a loop. Then, wireless communication device N3 returns the received frame to the adjacent node that is a local transmission source of the received frame. In this example, wireless communication device N3 returns the received frame to node N5 in S107. In the following descriptions, an operation, performed by a wireless communication device, of returning a received frame to the adjacent node that is the transmission source of that received frame in response to the detection of a loop may be referred to as "back track".

Hereinafter, a wireless communication device that has received the frame similarly determines an adjacent node to which that frame is to be forwarded, in accordance with the destination of that frame. Specifically, in S108 through S112, the frame is forwarded from node N5 to node N7 via nodes N4, N3, N2 and N6.

FIG. 2 illustrates an example of a format of a frame used in a wireless ad hoc network. A frame used in this example includes an LD field, an LS field, a GD field, a GS field, an FID field, a type field, an LH field, an LB field, a length field and a payload.

The LD (Local Destination) field stores information for identifying an adjacent node that is the transmission destination. The LS (Local Source) field stores information of the node that is the transmission source of the frame. In for example a frame transmitted from node N1 to node N2 in S101 illustrated in FIG. 1, "LD=N2" and "LS=N1" are set. Also, in a frame transmitted from node N2 to node N3 in S102, "LD=N3" and "LS=N2" are set. Note that the LD field and the LS field are updated in a node that forwards the frame.

The GD field stores GD information for identifying the final destination node of a frame. The GS field stores GS information for identifying the node that generated the frame. In the example illustrated in FIG. 1, "GD=N7" and "GS=N1" are set in the frame transmitted from node N1. Note that a GD field and a GS field are not updated during transmission of a frame.

The FID (Frame Identifier) field stores an FID for identifying each frame in a wireless ad hoc network. An FID is added to a frame in a GS node, and is not updated during the transmission of that frame. Accordingly, each frame transmitted in a wireless ad hoc network is uniquely identified by a combination of the GS and the FID. Note that an FID is implemented by for example a sequence number.

The type field stores type information representing the type of a frame. For example, type information can represent a data frame storing user data, an ACK frame acknowledging the reception of a frame, etc.

The LH (Loop Hop) field stores a hop count value for counting the number of hops in frame forwarding. Note that in a GS node, the initial value of the hop count value is set in the LH field. The hop count value is incremented or decremented when a frame is forwarded by a wireless communication device. It is assumed for example that "hop count value=10" has been added to the frame transmitted from node N1 illustrated in FIG. 1. In such a case, the hop count value is updated to "9" in node N2 and is updated to "8" in node N3.

The hop count value is rest to the initial value when the hop count counted from the source node has reached a specified value. In the above example, when the hop count value has reached "0" after being decremented by one from "10", the hop count value is reset to "10". Accordingly, when the hop count value has been initialized in a node, the hop count value represents the number of hops counting from the node that initialized the hop count value.

Note that initial values or updating methods of a hop count value are not limited to the above examples. For example, the initial value of a hop count value may be zero. In such a case, each time a frame is forwarded by a wireless communication device, the hop count value is incremented.

When the hop count value has reached "10" after being incremented by one from "0", the hop count value is reset to "0".

The LB (Loop detection Bit) field stores a loop detection array having a specified length. In the initial state, all bits in the loop detection array are set to zero. In a loop detection array added to a received frame, each wireless communication device updates one or a plurality of bits that correspond to the node of the wireless communication device to "1" from "0". The loop detection array is used for deciding whether or not the route in which a frame has been transmitted is a loop. In other words, a wireless communication device uses a loop detection array added to a received frame so as to decide whether or not the route in which that frame has been transmitted is a loop. A method of detecting a loop by using a loop detection array will be explained later in detail.

Note that a loop detection array is an example of a bit string for making loop decision. Accordingly, it is not always necessary for wireless communication devices to use "array" for making loop decision. In other words, the wireless communication device can use a bit string for loop decision that has been added to a received frame so as to decide whether or not the route in which the frame has been transmitted is a loop.

The length field stores information representing the length of the payload. The payload stores data. Note that frames transmitted in a wireless ad hoc network may include other information elements.

Figure 3:
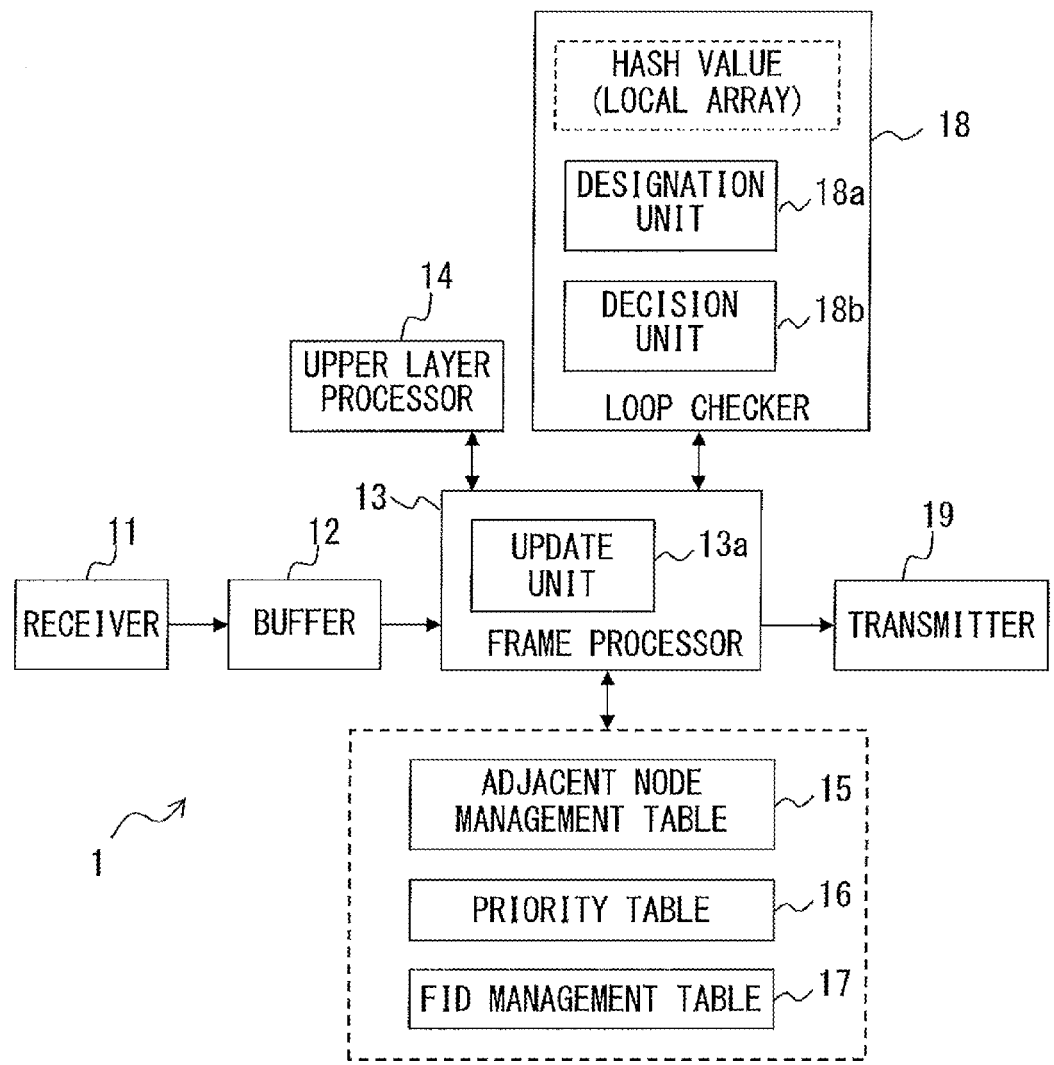
FIG. 3 illustrates an example of functions of a wireless communication device.

FIG. 3 illustrates an example of functions of a wireless communication device that is used in a wireless ad hoc network. A wireless communication device 1, as illustrated in FIG. 3, includes a receiver 11, a buffer 12, a frame processor 13, an upper layer processor 14, an adjacent node management table 15, a priority table 16, an FID management table 17, a loop checker 18 and a transmitter 19. However, the wireless communication device 1 may further be provided with a function that is not illustrated in FIG. 3.

The receiver 11 receives a frame from a different wireless communication device. The frame received by the receiver 11 is once stored in the buffer 12. Note that the receiver 11 is connected to a reception device in a wireless transceiver module. The buffer 12 is implemented by for example a semiconductor memory.

The frame processor 13 processes the received frame. When the destination of the received frame is the wireless communication device 1, the frame processor 13 guides the received frame to the upper layer processor 14. When the destination of the received frame is not the wireless communication device 1, the frame processor 13 determines an adjacent node to which that received frame is to be forwarded (i.e., an LD) in accordance with the destination of the received frame (i.e., a GD). When the wireless communication device 1 generates and transmits a frame, the frame processor 13 can generate a new frame. Note that the frame processor 13 includes an update unit 13a, which will be described later.

The upper layer processor 14 processes data stored in the payload of the received frame. Also, the upper layer processor 14 can generate data that is transmitted from the wireless communication device 1. Data generated by the upper layer processor 14 is stored in the payload of a transmission frame by the frame processor 13.

Figures 4A, 4B:
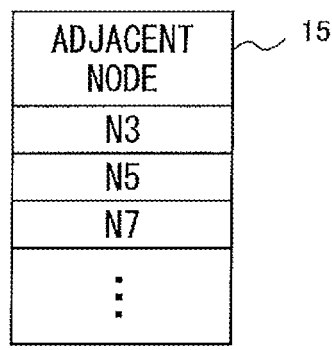
FIG. 4A and FIG. 4B illustrate examples of an adjacent node management table and a priority table.

FIG. 4A illustrates an example of the adjacent node management table 15. In the adjacent node management table 15, a node ID for identifying a node adjacent to the wireless communication device 1 is registered. In this example, it is assumed that the wireless communication device 1 is provided with a function of detecting an adjacent node. For example, the wireless communication device 1 periodically confirms the existence of an adjacent node. When a new adjacent node is detected, that new adjacent node is registered in the adjacent node management table 15. Note that FIG. 4A illustrates the adjacent node management table 15 that is provided to wireless communication device N4 illustrated in FIG. 1. Accordingly, nodes N3, N5 and N7 are registered in this adjacent node management table 15.

FIG. 4B illustrates an example of the priority table 16. In the priority table 16, an adjacent node to which a received frame is to be forwarded (i.e., an LD) is registered for each destination (i.e., a GD). Specifically, in the priority table 16, a specified number of LDs with high priority are registered for each GD. The frame processor 13 refers to this priority table 16 so as to determine an adjacent node to which a received frame is to be forwarded.

Note that FIG. 4B illustrates the priority table 16 that is provided to wireless communication device N4 illustrated in FIG. 1. Accordingly, when the destination of a received frame is node N7, wireless communication device N4 refers to the priority table 16 so as to obtain "LD=N7". Then, wireless communication device N4 forwards the received frame to node N7. However, in the example illustrated in FIG. 1, the frame transmission from node N4 to node N7 has failed. Accordingly, wireless communication device N4 refers to the priority table 16 again, and selects the adjacent node having the second highest priority. As a result of this, wireless communication device N4 forwards the received frame to node N5.

FIG. 5 illustrates an example of the FID management table 17. In the FID management table 17, information for managing a frame that the wireless communication device 1 transmitted or forwarded previously is stored. Also, a record of the FID management table 17 is generated for a combination of a FID and a GS. When the wireless communication device 1 transmits or forwards a frame, the FID, the GS information, the LD information and the hop count value set in the header of that frame are written to the FID field, the GS field, the LD field and the HOP field of the FID management table 17, respectively. In the OLS (Original LS) field, a node ID representing the adjacent node that is the transmission source of the received frame is written. Further, in the FID management table 17, the time at which each record was lastly updated is recorded.

When a loop is established in a transmission route of a frame, a frame previously transmitted or forwarded by the wireless communication device 1 is returned to the wireless communication device 1. In such a case, the combination of the FID and the GS of the frame retuned to the wireless communication device 1 has been registered in the FID management table 17. Accordingly, a new record for the frame returned to the wireless communication device 1 is not generated and the LD field and the HOP field are updated in the corresponding record, which has been generated previously. However, when a frame has been returned to the wireless communication device 1, the OLS field is not updated. In other words, the node ID stored in the OLS field represents the adjacent node that is the transmission source of the frame at the time when the wireless communication device 1 first received that frame.

As described above, the FID management table 17 stores information for managing a frame previously transmitted or forwarded by the wireless communication device 1. Accordingly, the wireless communication device 1 can detect a loop by using the FID management table 17. When for example the combination of the FID and the GS of a received frame has already been registered in the FID management table 17, the wireless communication device 1 can decide that a loop is established.

However, in order to detect a loop in a wireless ad hoc network highly accurately by using this method, a transmitted frame and a forwarded frame have to be managed for a relatively long period of time. As an example, it is needed to manage each frame for a period of time corresponding to the maximum number of hops of the wireless ad hoc network. This makes the size of the FID management table 17 larger. Accordingly, the wireless communication device 1 detects a loop in a wireless ad hoc network by using a different method, which will be described later, in order to reduce the memory capacity that is used.

In order to decide whether or not a received frame is a frame returned from an adjacent node due to back track (referred to as a "back track frame" hereinafter), the wireless communication device 1 may use the FID management table 17. "Back track" used herein means an operation in which a frame was transmitted from wireless communication device X to wireless communication device Y and that frame is directly returned from wireless communication device Y to wireless communication device X. In this example, wireless communication devices X and Y are adjacent to each other. Accordingly, a period of time that elapses between the transmission of a frame from wireless communication device X to wireless communication device Y and the reception, in the wireless communication device X, of the back track frame from wireless communication device Y is equivalent to the period of time during which a frame is transmitted over two hops in a wireless ad hoc network, which is very short. Accordingly, when the FID management table 17 is used for the purpose of detecting a back track frame, a period of time during which a frame transmitted or forwarded by the wireless communication device 1 is to be managed by using the FID management table 17 can be relatively short. In other words, compared with a case when the FID management table 17 is used for loop decision, the FID management table 17 can be small sufficiently in size when it is used for detecting a back track frame.

When the wireless communication device 1 has received a frame, the loop checker 18 decides whether or not the route in which the frame has been transmitted is a loop. In this example, the loop checker 18 includes a designation unit 18a and a decision unit 18b, which will be described later. Then, the result of the decision made by the loop checker 18 is reported to the frame processor 13. Note that the frame processor 13 determines an adjacent node to which the received frame is to be forwarded (i.e., LD), in accordance with the destination of the received frame (i.e., GD). However, when the loop checker 18 has decided that the route in which the received frame has been transmitted is a loop, the frame processor 13 returns the received frame to the adjacent node that is the local source of that received frame. In other words, back track is performed. In the example illustrated in FIG. 1, wireless communication device N3 returns a received frame to node N5 when it has detected a loop in S106.

The transmitter 19 transmits a frame generated or updated by the frame processor 13 to an adjacent node. For this transmission, the transmitter 19 transmits the frame to an adjacent node designated by the LD set in the header of the frame. Note that the operation of transmitting a frame updated by the frame processor 13 to an adjacent node includes back track.

Figure 6:
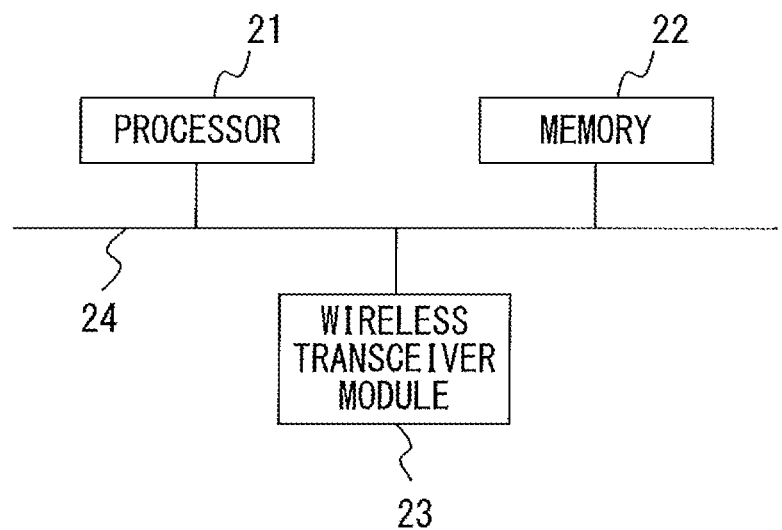
FIG. 6 illustrates an example of a hardware configuration of a wireless communication device.

FIG. 6 illustrates an example of a hardware configuration of the wireless communication device 1. As illustrated in FIG. 6, the wireless communication device 1 includes a processor 21, a memory 22 and a wireless transceiver module 23. The processor 21, the memory 22 and the wireless transceiver module 23 are connected via for example a bus 24. Note that the wireless communication device 1 may further be provided with circuit elements that are not illustrated in FIG. 6.

The processor 21 can execute a given program so as to provide the functions of the receiver 11, the frame processor 13, the upper layer processor 14, the loop checker 18 and the transmitter 19 illustrated in FIG. 3. However, some of the functions of the receiver 11, the frame processor 13, the upper layer processor 14, the loop checker 18 and the transmitter 19 may be implemented by using a hardware circuit.

The memory 22 can store a program that is executed by the processor 21. Also, the memory 22 can provide the buffer 12. Further, the adjacent node management table 15, the priority table 16 and the FID management table 17 are created by using the memory 22. The memory 22 is implemented by for example a semiconductor memory.

The wireless transceiver module 23 includes a transmitter device and a receiver device. The transmitter device can transmit a wireless signal representing a frame generated or updated by the frame processor 13 to an adjacent node. The receiver device can terminate a wireless signal transmitted from an adjacent node in order to reproduce a frame.

As described above, the function of the wireless communication device 1 is provided by for example executing a wireless communication program by using a processor. Thus, it is not always necessary to provide the function of the wireless communication device 1 in a form of a single independent device. For example, when a wireless communication program is installed in a measurement device that includes a processor and a memory, that measurement device can provide the above functions of the wireless communication device 1. In such a case, the measurement device can transmit measurement data toward the destination by executing the wireless communication program, and can also forward data received from a different node toward the destination.

Next, explanations will be given for loop decision made by the loop checker 18. In this example, the loop checker 18 uses a Bloom filter so as to detect a loop in a wireless ad hoc network. A Bloom filter can decide whether or not a given element belongs to a set by utilizing a hash function. Accordingly, brief explanations will be given for a hash function and a Bloom filter before describing loop decision.

Hash function is an irreversible one-way function, and generates a hash value that corresponds to a given ken. In the example illustrated in FIG. 7, when key value A is input to the hash function, hash value X is generated. Similarly, when key B is input to the hash function, hash value Y is generated, while hash value Z is generated in response to input of key value C to the hash function. Like this, when different key values are input to the hash function, hash values that are basically different are generated. However, even when different key values are input to the hash function, identical hash values may be generated in some cases. In the example illustrated in FIG. 7, hash value X is generated also when key value D is input to the hash function. In the descriptions below, a case where identical hash values are generated in response to input of different key values to the hash function may be referred to "collision".

When a Bloom filter is implemented by using a hash function, a hash value generated by the hash function designates a bit position in the array of the Bloom filter. The length of the array is specified in advance. In the initial state of the array, all bits are set to zero.

When the length of the array is m bits, the hash value generated when a certain key value is given to the hash function is one of "1" through "m". In the example illustrated in FIG. 8, "m=8" is satisfied. Note that, in the descriptions below, a state where a bit in the array is zero may be referred to as "not used" and a state where a bit in the array is "1" may be referred to as "used".

It is assumed that when key value A is given to the hash function, "2" is generated as a hash value. In this example, a hash value designates a bit position in the array. As a result of this, the second bit of the array is updated to "1 (used)" for key value A.

It is also assumed that "5" is generated as a hash value when key value B is given to the hash function, and "3" is generated as a hash value when key value C is given to the hash function. As a result of this, the fifth and third bits of the array are updated to "1 (used)".

In this situation, the Bloom filter can decide whether or not value X is an element of a set [A, B, C]. When this decision is made, value X is given to the hash function, and corresponding hash value x is generated. This hash value x is one of "1" through "8". When hash value x is one of "2", "3" and "5", it is decided that value X is an element of a set [A, B, C]. In other words, it is decided that "value X is identical to one of A, B and C". When hash value x is not one of "2", "3" and "5", it is decided that value X is not an element of a set [A, B, C]. In other words, it is decided that "value X is identical to none of A, B and C".

However, as explained in FIG. 7, a hash function may generate identical hash values for different key values in some cases. Accordingly, a case may actually occur in which hash value x is one of "2", "3" and "5" despite that "value X is identical to none of A, B and C". Such a case is referred to as "false positive".

When false positive has occurred in a Bloom filter, erroneous decision result is obtained. However, false negative does not occur in a Bloom filter. Accordingly, when value X belongs to a set [A, B, C], it is never decided that "value X does not belong to a set [A, B, C]. Accordingly, when a Bloom filter is used for making loop decision, erroneous detection that "it is decided that a loop is established even when a loop is not established actually" may occur, whereas false-negative (fail to detect) that "it is decided that a loop is not established even when a loop is established actually" does not occur.

Note that the probability that erroneous detection is caused by false positive (false-positive occurrence probability p) is approximately expressed by expression (1) below, where m represents the length (the number of bits) of the array and n represents the number of bits to which "1 (used)" is added in the array.

$$p=0.6185^{(m/n)} \quad (1)$$

The wireless communication device 1 makes loop decision by using the Bloom filter. The loop decision is realized by checking whether or not a frame previously transmitted by a wireless communication device is returned to that wireless communication device. Accordingly, the loop decision may be realized by checking whether or not a frame received by a wireless communication device is a frame that was previously transmitted by that wireless communication device. Accordingly, the loop decision is made by using a Bloom filter under the following operation conditions.

(1) The respective wireless communication devices use the same hash function.
(2) The key value given to the hash function in each wireless communication device is identification information for identifying a wireless communication device (for example, the MAC address of the wireless communication device).

The Bloom filter is designed based on expression (1) in such a manner that the false-positive occurrence probability is lower than a specified threshold. It is assumed for example that a wireless ad hoc network is a meshed network including 500 through 1000 nodes. It is also assumed that an autonomous forwarding process as explained in FIG. 1 through FIG. 4B is executed in each node. In such a case, it is known from experience that the average hop count of a route for transmitting a frame from a source node to a desired destination node is approximately 10.

Figure 9:
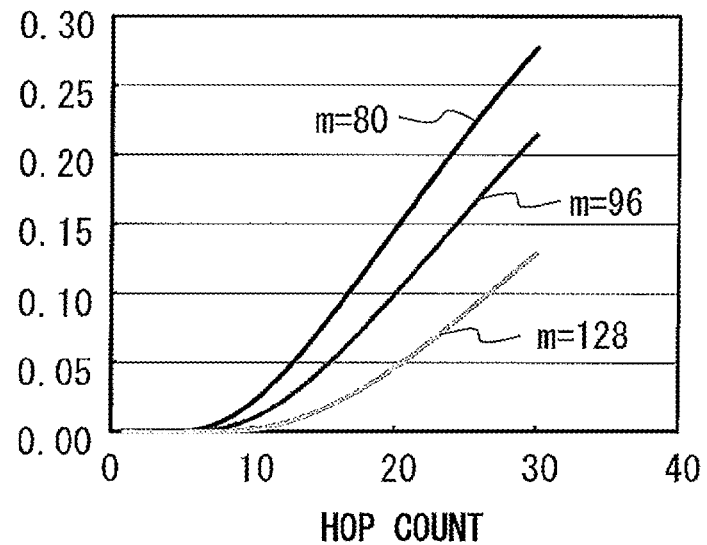
FIG. 9 illustrates an example of false-positive occurrence probabilities with respect to the lengths of arrays and hop counts.

It is assumed in this example that when a frame is transmitted from a source node to a destination node, "1 (used)" is added to the array in each node. Then, false-positive occurrence probabilities p in a node distant from the source node by n hops are as illustrated in FIG. 9. As described above, when an array is long, false-positive occurrence probability p is low. Also, in a node with a large hop count from a source node, false-positive occurrence probability p is high. Further, the Bloom filter is designed in such a manner that this false-positive occurrence probability p is lower than a specified threshold. For example, in a node distant from a source node by 10 hops, it is needed for length m of the array to be longer than or equal to 96 in order to make false-positive occurrence probability p in such anode lower than one percent.

In addition, loop decision is made by using k hash functions in each node. An appropriate value for k (i.e., the value that minimizes false-positive occurrence probability p) is expressed by expression (2) below, where m represents the length of the array (the number of bits) and n represents the number of hops from the source node.

$$k=(m/n)\ln 2 \quad (2)$$

When m=96 and n=10 are given to expression (2), k=6.554 is obtained. Accordingly, loop decision is made by using seven hash functions in each node. In such a case, the wireless communication device 1 generates seven hash values by for example giving the MAC address of the node of the wireless communication device 1 to the seven hash functions. Each hash value designates a bit position in the array. Then, the wireless communication device 1 checks whether or not the bit designated by each hash value is "1 (used)" in a bit detection array stored in the LB field of a received frame, and thereby makes loop decision.

FIG. 10 is a flowchart illustrating an example of a process of a wireless communication device of a source node. Note that the flowchart illustrated in FIG. 10 is executed when the wireless communication device 1 generates and transmits a frame. In the descriptions below, a hop count value for counting the hop count may be referred to as "LH". A loop detection array may be referred to as "LB".

In S1, the frame processor 13 generates a frame illustrated in FIG. 2. The address of the destination node of the frame is stored in the GD field. The transmission data is stored in the payload.

In S2, the frame processor 13 determines an adjacent node to which the frame is to be transmitted (i.e., LD) based on the destination node. For this determination, the LD is determined by referring to the priority table 16 illustrated in FIG. 4B. In other words, the adjacent node that has been given the highest priority for the destination of the frame (i.e., GD) is selected.

In S3, the frame processor 13 initializes hop count value LH and loop detection array LB that are to be added to the frame. The initial value for hop count value LH is 10 in this example. "10" corresponds to the average number of hops of a route for transmitting a frame from a source node to a desired destination node in a wireless ad hoc network. Also, in the initial state of loop detection array LB, all bits are set to zero.

In S4, the frame processor 13 adds, to loop detection array LB, a loop detection bit generated based on the identification information for identifying the wireless communication device 1. In this example, by giving the MAC address of the wireless communication device 1 to a hash function that is prepared in advance, a hash value designating a bit in a loop detection array is generated. The operation of setting a bit designated by a hash value to "1 (used)" corresponds to the operation of adding a loop detection bit of the wireless communication device 1 to loop detection array LB. In other words, the operation of adding a loop detection bit of the wireless communication device 1 to loop detection array LB is realized by an operation of setting, to "1 (used)", a bit designated in a loop detection array by a hash value corresponding to the MAC address of the wireless communication device 1. When each wireless communication device uses k hash functions so as to generate k hash values from the MAC address, k bits designated in the loop detection array are set to "1".

In S5, the transmitter 19 transmits the frame generated in S1 through S4 to an adjacent node. In other words, the frame is transmitted to an adjacent node via the wireless transceiver module 23 illustrated in FIG. 6. This frame arrives at each adjacent node in the communication area of the wireless communication device 1. However, when the LD information stored in the LD field of a frame received by a wireless communication device represents a different node, the wireless communication device discards the received frame. Accordingly, in reality, only a wireless communication device identified by the LD information receives the frame.

Figure 11:
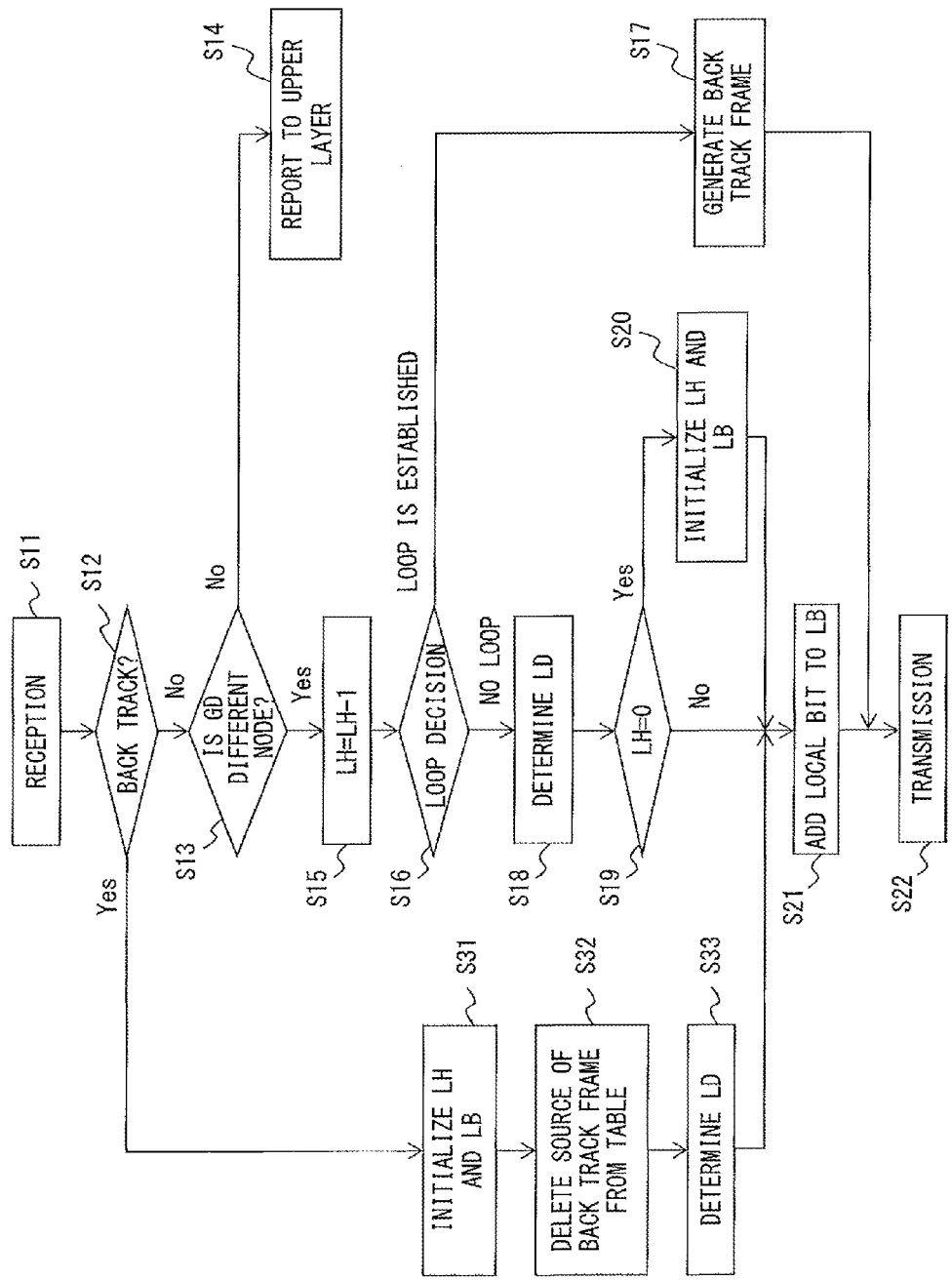
FIG. 11 is a flowchart illustrating an example of a process of a wireless communication device that receives a frame.

FIG. 11 is a flowchart illustrating an example of a process of a wireless communication device that receives a frame from an adjacent node. The flowchart illustrated in FIG. 11 is executed when the wireless communication device 1 receives a frame.

In S11, the receiver 11 receives a frame from an adjacent node. Then, the receiver 11 stores the received frame in the buffer 12. Note that, as described above, when the LD information stored in the LD field of a received frame represents a different node, the receiver 11 discards that received frame.

In S12, the frame processor 13 decides whether or not the received frame is a back track frame. In this example, the frame processor 13 may decide whether or not the received frame is a back track frame by using the FID management table 17 illustrated in FIG. 5. When for example the combination of the GS and the FID stored in the header of the received frame has been registered in the FID management table 17 and the LD recorded in the record corresponding to that combination is identical to the LS stored in the header of the received frame, the frame processor 13 decides that the received frame is a back track frame. However, it is also possible for the frame processor 13 to decide whether or not a received frame is a back track frame by using a different method.

When the received frame is not a back track frame, the process of the wireless communication device 1 proceeds to S13. In S13, the frame processor 13 refers to the GD stored in the header of the received frame so as to decide whether or not the final destination of the received frame is a different node. When the final destination of the received frame is the node of the frame processor 13 itself (i.e., the wireless communication device 1), the frame processor 13 feds the received frame to the upper layer processor 14 in S14. Then, the upper layer processor 14 processes the received frame.

When the final destination of the received frame is a different node, the frame processor 13 decrements, by one, hop count value LH stored in the header of the received frame in S15. In other words, "LH=LH−1" is executed.

In S16, the loop checker 18 decides whether or not the route in which the received frame has been transmitted is a loop by using loop detection array LB stored in the header of the received frame and the loop detection bit of the wireless communication device 1 (the loop detection bit of the local node). The loop decision method will be described later in detail.

When it is decided that the route in which the received frame has been transmitted is a loop, the frame processor 13 generates a frame to be returned to the adjacent node that is the local transmission source of the received frame (i.e., a back track frame) in S17. The back track frame is generated by exchanging "LS" and "LD" stored in the header of the received frame.

When it is decided that the route in which the received frame has been transmitted is not a loop, the frame processor 13 determines an adjacent node to which that frame is to be forwarded (i.e., LD), based on the final destination of the received frame in S18. For this determination, LD is determined by referring to the priority table 16 illustrated in FIG. 4B. In other words, the adjacent node that is given the highest priority for the destination of the frame (i.e., GD) is selected.

In S19, the frame processor 13 decides whether or not hop count value LH added to the received frame is zero. When hop count value LH is zero, it is decided that the hop count from the node in which hop count value LH was initialized has reached the threshold (10 in this example). In such a case, the frame processor 13 initializes hop count value LH and loop detection array LB added to the received frame in S20. Specifically, hop count value LH is initialized into 10. Also, all bits in loop detection array LB are initialized into zero. When hop count value LH added in the received frame is not zero, the process in S20 is skipped.

In S21, the frame processor 13 adds a loop detection bit to loop detection array LB in the received frame. The loop detection bit is generated based on the MAC address of the wireless communication device 1. Note that S4 in FIG. 10 and S21 in FIG. 11 are substantially the same, and the explanations thereof will be omitted.

In S22, the transmitter 19 transmits a frame obtained from S11 through S21 or S31 through S33 to the adjacent node. In other words, the frame is transmitted to the adjacent node via the wireless transceiver module 23 illustrated in FIG. 6.

When the received frame is a back track frame, the process of the wireless communication device 1 proceeds to S31. In S31, the frame processor 13 initializes hop count value LH and loop detection array LB in the received frame. In other words, hop count value LH is initialized into 10. Also, all bits in loop detection array LB are initialized into zero.

In S32, the frame processor 13 deletes, from the priority table 16, the adjacent node that is the local transmission source of the back track frame. The wireless communication device 1 does not forward the received frame to an adjacent node that is not registered in the priority table 16. Note that it is also possible for the frame processor 13 to update the priority table 16 in such a manner that the priority of the adjacent node that is the local source of the back track frame is low.

In S33, the frame processor 13 determines the adjacent node to which the received frame is to be forwarded (i.e., LD) based on the final destination of that received frame. For this determination, the LD is determined by referring to the priority table 16 illustrated in FIG. 4B. That is, the LD is determined by referring to the priority table 16 updated in S32. Specifically, the adjacent node with the highest priority next to that of the adjacent node selected previously is selected.

As described above, when forwarding a received frame toward a destination node, the wireless communication device 1 updates hop count value LH and loop detection array LB. Hop count value LH is set and updated as below.
(1) The wireless communication device of the source node initializes hop count value LH into "10".
(2) The wireless communication device that receives a frame decrements hop count value LH of the received frame by one.
(3) When hop count value LH of the received frame is zero, the wireless communication device initializes hop count value LH into "10".

Also, loop detection array LB is set and updated as below.
(1) Each wireless communication device gives the MAC address of itself to the hash function so as to generate a hash value. The hash value designates a bit in loop detection array LB. In the descriptions below, a bit designated by the hash value corresponding to the MAC address of itself is referred to as a "local bit".
(2) The wireless communication device of the source node initializes each bit of loop detection array LB into "0 (not used)".
(3) The wireless communication device of the source node updates the local bit to "1 (used)" in loop detection array LB.
(4) The wireless communication device that receives the frame checks whether or not the local bit is being used in the bit detection array LB of the received frame.
(5) When the local bit is being used in the bit detection array LB in the received frame, the wireless communication device decides that the route in which the received frame has been transmitted is a loop. In such a case, the received frame is returned to the adjacent node that is the local transmission source of the received frame (track back). Also, hop count value LH and loop detection array LB are initialized.
(6) When the local bit is not used in bit detection array LB in the received frame, the wireless communication device decides that the route in which the received frame has been transmitted is not a loop. In such a case, the wireless communication device adds the local bit to the bit detection array LB and forwards the received frame.

Note that the update unit 13a provided in the frame processor 13 can update loop detection array LB and hop count value LH. In other words, S15, S20, S21 and S31 in the flowchart illustrated in FIG. 11 are executed by the update unit 13a. Also, the designation unit 18a provided in the loop checker 18 designates, based on the identification information for identifying the wireless communication device 1, a bit in loop detection array LB in a received frame. In this example, the designation unit 18a designates a bit in loop detection array LB by generating a hash value by utilizing a hash function. Further, the decision unit 18b provided in the loop checker 18 decides whether or not the route in which the received frame has been transmitted is a loop. In other words, S16 in the flowchart illustrated in FIG. 11 is executed by the decision unit 18b.

Figure 12A:
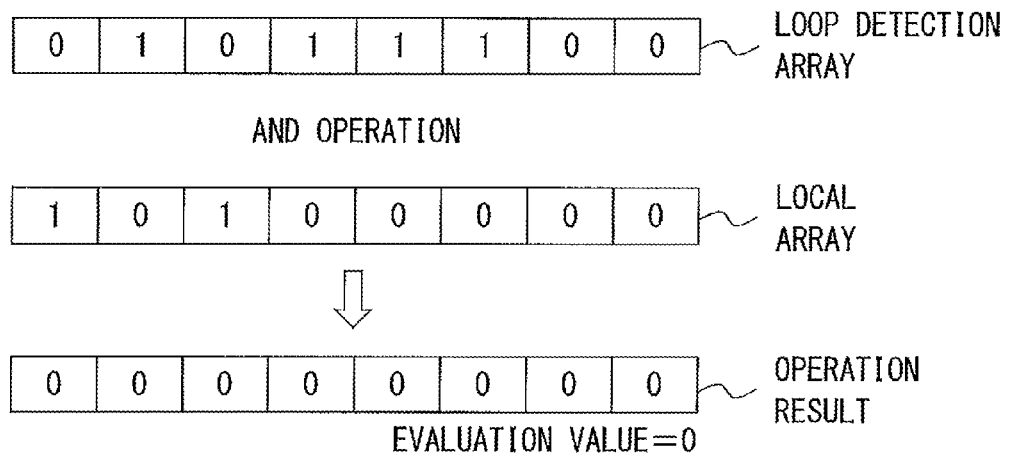
FIG. 12A and FIG. 12B illustrate examples of loop decision.
Figure 12B:
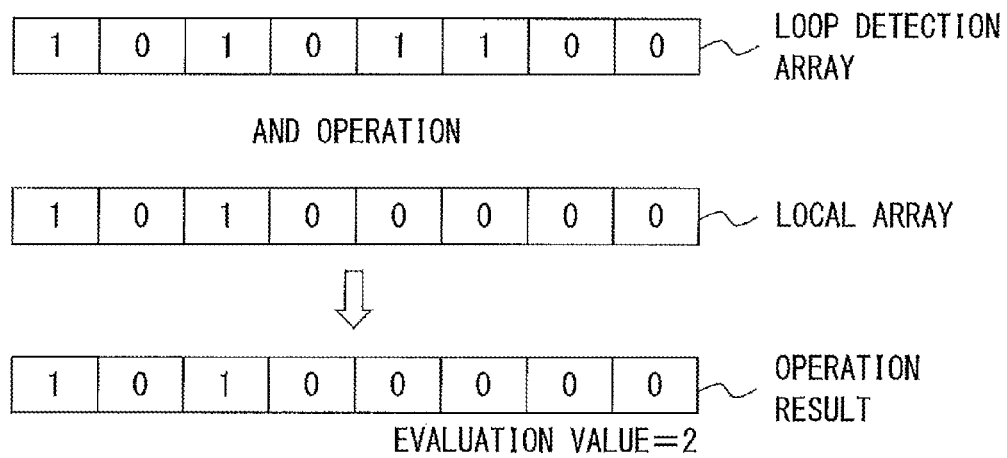

FIG. 12A and FIG. 12B illustrate examples of loop decision. These processes correspond to examples of S16 in FIG. 11. In the examples illustrated in FIG. 12A and FIG. 12B, the length of loop detection array LB is 8 bits. A loop detection bit is of two bits. In other words, in each wireless communication device, two hash values are generated by using two hash functions.

The wireless communication device 1 generates a local array in advance. The length of the local array is identical to that of loop detection array LB in a transmitted frame. Each bit in the local array is "zero". However, the bit designated by the hash value is "1". In this example, two hash values are "1" and "3", respectively. Accordingly, the local array is "10100000" as illustrated in FIG. 12A. Note that the local array is generated by and stored in for example the loop checker 18.

In the example illustrated in FIG. 12A, loop detection array LB in the frame received by the wireless communication device 1 is "01011100". When the wireless communication device 1 receives a frame, the loop checker 18 obtains loop detection array LB in the received frame. Then, the loop checker 18 performs an AND operation for each bit between loop detection array LB and the local array. In this example, an operation result array "00000000" is obtained.

The loop checker 18 makes loop decision based on the result of the above AND operation. Specifically, the loop checker 18 counts the number of "1" in the AND operation result array. When the number of "1" in the AND operation result array and the number of hash functions are not identical, the loop checker 18 decides that the route in which the received frame has been transmitted is not a loop.

In the example illustrated in FIG. 12B, loop detection array LB in the frame received by the wireless communication device 1 is "10101100". In such a case, when an AND operation is performed between loop detection array LB and the local array, an AND operation result array "10100000" is obtained. The number of "1" in the AND operation result array is two, which is identical to the number of the hash functions. Thus, the loop checker 18 decides that the route in which the received frame has been transmitted is a loop.

As described above, when all bits designated by k hash functions in loop detection array LB in a received frame are "1 (used)", the wireless communication device decides that a loop is established. However, when forwarding a received frame, each wireless communication device adds the local bit to loop detection array LB. This increases a probability that erroneous detection occurs due to collision between hash values (or due to false positive of a Bloom filter) because many bits are being used in loop detection array LB in a node with a large hop count from the source node.

In view of the above phenomenon, hop count value LH for counting the number of hops is added to a frame transmitted in a wireless ad hoc network. Each wireless communication device refers to hop count value LH in a received frame so as to detect the hop count from the source node (or from the relay node that initialized hop count value LH) for each received frame. When the hop count has reached a specified threshold (10 in the above example), the wireless communication device initializes loop detection array LB. This suppresses erroneous detection based on collision between hash values (or based on false positive of a Bloom filter).

FIG. 13 illustrates an example of a method of updating a bit detection array. This process corresponds to an example of S21 illustrated in FIG. 11. Note that also in the example illustrated in FIG. 13, the length of loop detection array LB is 8 bits. Also, in each wireless communication device, two hash values are generated by using two hash functions.

The frame processor 13 performs an OR operation for each bit between loop detection array LB and the local array. In this example, an OR operation is performed between "01011100" and "10100000" so as to obtain an OR operation result array "11111100". This OR operation result array represents a state in which the local bit is added to loop detection array LB in the received frame. Accordingly, when forwarding a received frame, the frame processor 13 updates, to an OR operation result array, loop detection array LB in the received frame. Thereby, the wireless communication device 1 transmits toward the destination a frame including loop detection array LB to which the local bit is added.

First Example

Figure 14:
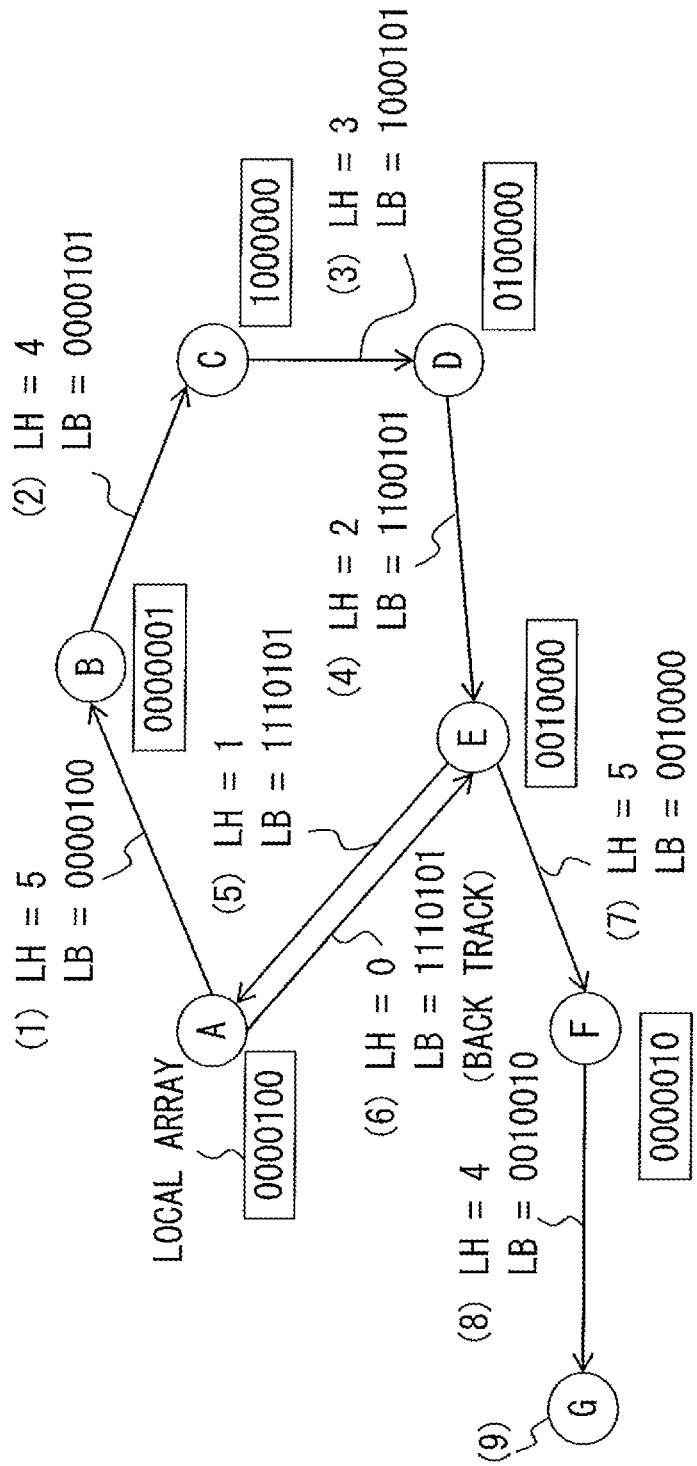
FIG. 14 illustrates frame forwarding according to a first embodiment.

In a first example, the wireless ad hoc network includes nodes A through G as illustrated in FIG. 14. Each of nodes A through G are is provided with a wireless communication device of the embodiment described above. The wireless communication devices provided to nodes A through G may be referred to as wireless communication devices A through G, respectively.

The length of loop detection array LB added to a frame is 7 bits. The initial value of hop count value LH added to a frame is 5. Wireless communication devices A through G give the MAC addresses of themselves to a hash function, respectively, and thereby generate hash values. In this example, wireless communication devices A through G use the same hash function so as to generate hash values, respectively. Wireless communication devices A through G respectively generate and hold local arrays in advance. The length of the local array is 7 bits, which is identical to the length of loop detection array LB. Also, the local array represents a hash value generated based on the MAC address. For example, the hash value generated in wireless communication device A designates the "fifth bit". In such a case, local array of wireless communication device A is "0000100" as illustrated in FIG. 14. Also, the hash value generated in wireless communication device B designates the "seventh bit". In such a case, local array of wireless communication device B is "0000001" as illustrated in FIG. 14.

In the first example, wireless communication device A, which is provided in node A, transmits data to node G. Hereinafter, explanations will be given to a sequence in which a frame transmitted from node A is forwarded to node G in a wireless ad hoc network.

Step 1: wireless communication device A generates a frame in accordance with the flowchart illustrated in FIG. 10. The destination (GD) of the frame is node G. The adjacent node that is the local transmission destination (LD) of the frame is node B. Hop count value LH is initialized into "5". Loop detection array LB is initialized into "0000000". Thereafter, the frame processor 13 adds the local bit to loop detection array LB. As an example, an OR operation is performed for each bit between loop detection array LB "0000000" and the local array "0000100" so as to generate updated loop detection array LB "0000100". Then, wireless communication device A transmits to node B the frame to which "LH=5" and "LB=0000100" are added.

Step 2: Wireless communication device B processes the received frame in accordance with the flowchart illustrated in FIG. 11. Specifically, the frame processor 13 decrements hop count value LH in the received frame from "5" to "4". The loop checker 18 performs an AND operation between loop detection array LB "0000100" in the received frame and the local array "0000001" of wireless communication device B so as to obtain an AND operation result array "0000000". Because this AND operation result array does not include "1", the loop checker 18 decides that the route in which the received frame has been transmitted is not a loop. Based on the destination of the received frame, the frame processor 13 selects the adjacent node to which that frame is to be transmitted. In this example, it is assumed that "LD=node C" is obtained for "GD=node G". The frame processor 13 adds the local bit to loop detection array LB. In this example, an OR operation is performed between loop detection array LB "0000100" and the local array "0000001" and thereby updated loop detection array LB "0000101" is generated. Then, wireless communication device B transmits to node C the frame to which "LH=4" and "LB=0000101" are added.

Step 3: Wireless communication device C processes the received frame in accordance with the flowchart illustrated in FIG. 11. Specifically, the frame processor 13 decrements hop count value LH in the received frame from "4" to "3". The loop checker 18 performs an AND operation between loop detection array LB "0000101" in the received frame and the local array "1000000" of wireless communication device C so as to obtain an AND operation result array "0000000". Because this AND operation result array does not include "1", the loop checker 18 decides that the route in which the received frame has been transmitted is not a loop. Based on the destination of the received frame, the frame processor 13 selects the adjacent node to which that frame is to be transmitted. In this example, it is assumed that "LD=node D" is obtained for "GD=node G". The frame processor 13 adds the local bit to loop detection array LB. In this example, an OR operation is performed between loop detection array LB "0000101" and the local array "1000000" and thereby updated loop detection array LB "1000101" is generated. Then, wireless communication device C transmits to node D the frame to which "LH=3" and "LB=1000101" are added.

Step 4: Wireless communication device D processes the received frame in accordance with the flowchart illustrated in FIG. 11. Specifically, the frame processor 13 decrements hop count value LH in the received frame from "3" to "2". The loop checker 18 performs an AND operation between loop detection array LB "1000101" in the received frame and the local array "0100000" of wireless communication device D so as to obtain an AND operation result array "0000000". Because this AND operation result array does not include "1", the loop checker 18 decides that the route in which the received frame has been transmitted is not a loop. Based on the destination of the received frame, the frame processor 13 selects the adjacent node to which that frame is to be transmitted. In this example, it is assumed that "LD=node E" is obtained for "GD=node G". The frame processor 13 adds the local bit to loop detection array LB. In this example, an OR operation is performed between loop detection array LB "1000101" and the local array "0100000" and thereby updated loop detection array LB "1100101" is generated. Then, wireless communication device D transmits to node E the frame to which "LH=2" and "LB=1100101" are added.

Step 5: Wireless communication device E processes the received frame in accordance with the flowchart illustrated in FIG. 11. Specifically, the frame processor 13 decrements hop count value LH in the received frame from "2" to "1". The loop checker 18 performs an AND operation between loop detection array LB "1100101" in the received frame and the local array "0010000" of wireless communication device E so as to obtain an AND operation result array "0000000". Because this AND operation result array does not include "1", the loop checker 18 decides that the route in which the received frame has been transmitted is not a loop. Based on the destination of the received frame, the frame processor 13 selects the adjacent node to which that frame is to be transmitted. In this example, it is assumed that "LD=node A" is obtained for "GD=node G". The frame processor 13 adds the local bit to loop detection array LB. In this example, an OR operation is performed between loop detection array LB "1100101" and the local array "0010000" and thereby updated loop detection array LB "1110101" is generated. Then, wireless communication device E transmits to node A the frame to which "LH=1" and "LB=1110101" are added.

Step 6: Wireless communication device A processes the received frame in accordance with the flowchart illustrated in FIG. 11. Specifically, the frame processor 13 decrements hop count value LH in the received frame from "1" to "0". The loop checker 18 performs an AND operation between loop detection array LB "1110101" in the received frame and the local array "0000100" of wireless communication device A so as to obtain an AND operation result array "0000100". Because this AND operation result array includes "1", the loop checker 18 decides that the route in which the received frame has been transmitted is a loop. When it is decided that the route in which the received frame has been transmitted is a loop, wireless communication device A executes back track. Specifically, wireless communication device A returns to node E the frame received from node E. In this returning, wireless communication device A returns to node E the frame to which "LH=0" and "LB=1110101" are added.

Step 7: Wireless communication device E processes the received frame in accordance with the flowchart illustrated in FIG. 11. The frame received by wireless communication device E is a back track frame. Accordingly, S31 through S33 in the flowchart illustrated in FIG. 11 are executed. Specifically, the frame processor 13 initializes hop count value LH into "5" and also initializes loop detection array LB into "0000000". Based on the destination of the received frame, the frame processor 13 selects the adjacent node to which that frame is to be transmitted. For this transmission, node A, which was selected in step 5, is deleted from the priority table 16, and the next priority adjacent node is selected. In this example, it is assumed that "LD=node F" is obtained for "GD=node G". The frame processor 13 adds the local bit to loop detection array LB. In this example, an OR operation is performed between initialized loop detection array LB "0000000" and the local array "0010000" of wireless communication device E, and thereby updated loop detection array LB "0010000" is generated. Then, wireless communication device E transmits to node F the frame to which "LH=5" and "LB=0010000" are added.

Step 8: Wireless communication device F processes the received frame in accordance with the flowchart illustrated in FIG. 11. Specifically, the frame processor 13 decrements hop count value LH in the received frame from "5" to "4". The loop checker 18 performs an AND operation between loop detection array LB "0010000" in the received frame and the local array "0000010" of wireless communication device F so as to obtain an AND operation result array "0000000". Because this AND operation result array does not include "1", the loop checker 18 decides that the route in which the received frame has been transmitted is not a loop. Based on the destination of the received frame, the frame processor 13 selects the adjacent node to which that frame is to be transmitted. In this example, it is assumed that "LD=node G" is obtained for "GD=node G". The frame processor 13 adds the local bit to loop detection array LB. In this example, an OR operation is performed between loop detection array LB "0010000" and the local array "0000010" and thereby updated loop detection array LB "0010010" is generated. Then, wireless communication device E transmits to node G the frame to which "LH=4" and "LB=0010010" are added.

Step 9: Wireless communication device G processes the received frame in accordance with the flowchart illustrated in FIG. 11. Specifically, upon detecting that the destination of the received frame is node G, the frame processor 13 feds data stored in the payload of that frame to the upper layer processor 14.

As described above, the wireless communication device 1 according to an embodiment of the present invention can decide whether or not the route in which a frame is transmitted is a loop by using loop detection array LB that is added to the frame. This makes it unnecessary for the wireless communication device 1 to manage a frame transmitted or forwarded in the past for a relatively long period of time in order to make loop decision. Accordingly, it is possible to reduce the capacity of a memory used for making loop decision compared with the conventional techniques.

When a frame is forwarded in a network, loop decision can be made even by using a method in which a node ID is added to the header of the frame in each node. However, this method causes changes in the header length, complicating the frame process in each node. Also, a greater value of a hop count makes headers longer, leading to deteriorated data transmission efficiency.

Second Example

Figure 15:
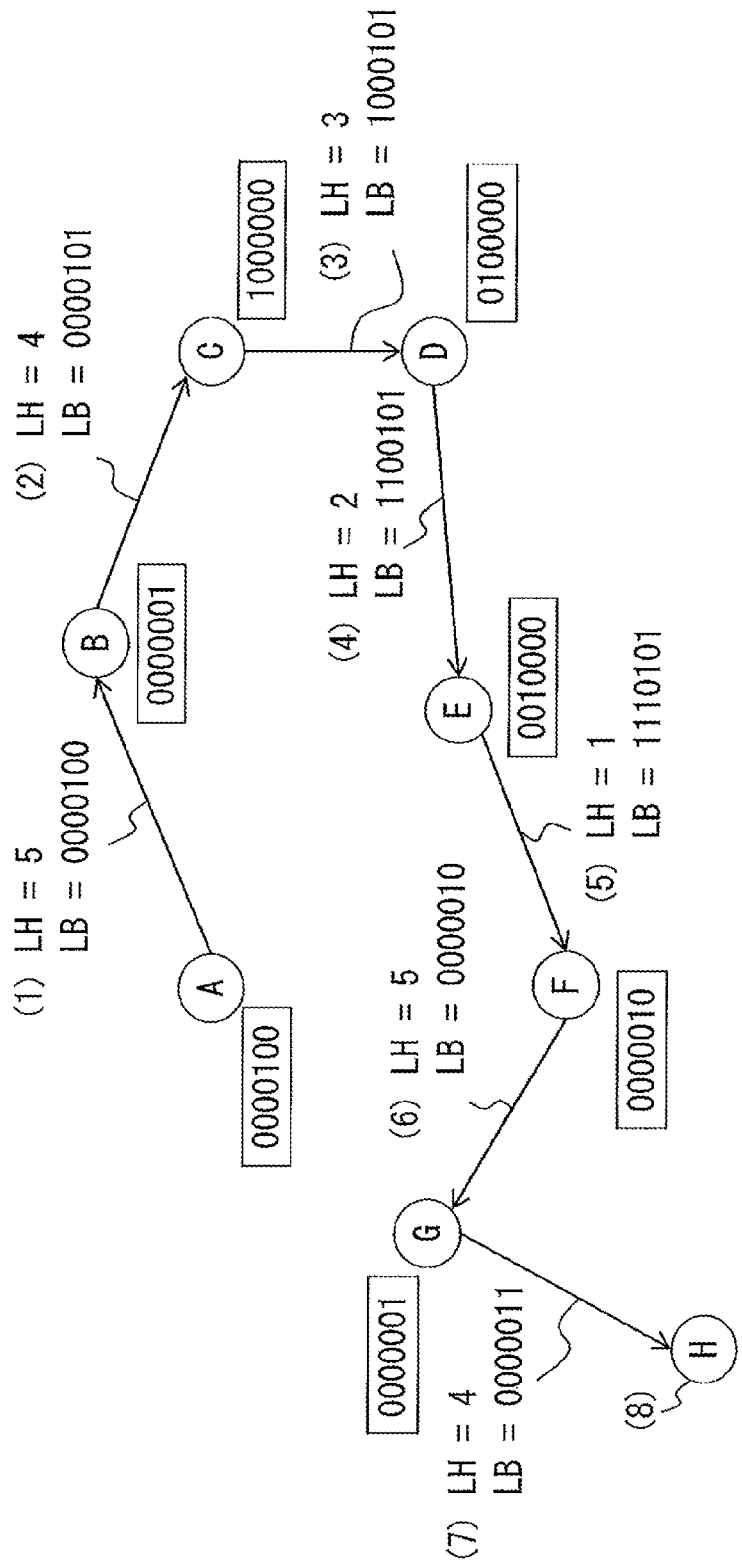
FIG. 15 illustrates frame forwarding according to a second embodiment.

The configuration of a wireless ad hoc network in a second example is similar to that in the first example. However, in the second example, the wireless ad hoc network includes node H in addition to nodes A through G as illustrated in FIG. 15.

The hash value generated in wireless communication device G is identical to the hash value generated in wireless communication device B, which designates the "seventh bit". Accordingly, the local array of wireless communication device G is "0000001" as illustrated in FIG. 15. In other words, the hash values of nodes B and G collide with each other. In such a case, there is a possibility that erroneous detection due to false positive occurs.

In order to address this problem, in the wireless communication method according to an embodiment of the present invention, hop count value LH is added to a frame. Then, by initializing loop detection array LB based on this hop count value LH, erroneous decision due to false positive is suppressed. Hereinafter, a sequence in which a frame transmitted from node A is forwarded to node H in a wireless ad hoc network is explained.

The processes in step 1 through step 4 in the second example are substantially the same as those in the first example. In other words, wireless communication device E receives from node D a frame to which "LH=2" and "LB=1100101" are added. However, in the second example, the final destination of the frame is node H.

Step 5: Wireless communication device E processes the received frame in accordance with the flowchart illustrated in FIG. 11. Specifically, the frame processor 13 decrements hop count value LH in the received frame from "2" to "1". The loop checker 18 performs an AND operation between loop detection array LB "1100101" in the received frame and the local array "0010000" of wireless communication device E so as to obtain an AND operation result array "0000000". Because this AND operation result array does not include "1", the loop checker 18 decides that the route in which the received frame has been transmitted is not a loop. Based on the destination of the received frame, the frame processor 13 selects the adjacent node to which that frame is to be transmitted. In this example, it is assumed that "LD=node F" is obtained for "GD=node H". The frame processor 13 adds the local bit to loop detection array LB. In this example, an OR operation is performed between loop detection array LB "1100101" and the local array "0010000" and thereby updated loop detection array LB "1110101" is generated. Then, wireless communication device E transmits to node F the frame to which "LH=1" and "LB=1110101" are added.

Step 6: Wireless communication device F processes the received frame in accordance with the flowchart illustrated in FIG. 11. Specifically, the frame processor 13 decrements hop count value LH in the received frame from "1" to "0". The loop checker 18 performs an AND operation between loop detection array LB "1110101" in the received frame and the local array "0000010" of wireless communication device F so as to obtain an AND operation result array "0000000". Because this AND operation result array does not include "1", the loop checker 18 decides that the route in which the received frame has been transmitted is not a loop. Based on the destination of the received frame, the frame processor 13 selects the adjacent node to which that frame is to be transmitted. In this example, it is assumed that "LD=node G" is obtained for "GD=node H". However, hop count value LH has been updated to "0". Accordingly, the frame processor 13 initializes hop count value LH into "5" and also initializes loop detection array LB into "0000000". Thereafter, the frame processor 13 adds the local bit to initialized loop detection array LB. In this example, an OR operation is performed between loop detection array LB "0000000" and the local array "0000010" and thereby updated loop detection array LB "0000010" is generated. Then, wireless communication device E transmits to node G the frame to which "LH=5" and "LB=0000010" are added.

Step 7: Wireless communication device G processes the received frame in accordance with the flowchart illustrated in FIG. 11. Specifically, the frame processor 13 decrements hop count value LH in the received frame from "5" to "4". The loop checker 18 performs an AND operation between loop detection array LB "0000010" in the received frame and the local array "0000001" of wireless communication device G so as to obtain an AND operation result array "0000000". Because this AND operation result array does not include "1", the loop checker 18 decides that the route in which the received frame has been transmitted is not a loop. Based on the destination of the received frame, the frame processor 13 selects the adjacent node to which that frame is to be transmitted. In this example, it is assumed that "LD=node H" is obtained for "GD=node H". The frame processor 13 adds the local bit to loop detection array LB. In this example, an OR operation is performed between loop detection array LB "0000010" and the local array "0000001" so as to generate updated loop detection array LB "0000011". Then, wireless communication device G transmits to node H the frame to which "LH=4" and "LB=0000011" are added.

Step 8: Wireless communication device H processes the received frame in accordance with the flowchart illustrated in FIG. 11. Specifically, upon detecting that the destination of the received frame is node H, the frame processor 13 feds the data stored in the payload in that frame to upper layer processor 14.

As described above, when the hop count from the source node has reached a specified value, the wireless communication device 1 initializes loop detection array LB added to the frame. In the example illustrated in FIG. 14, loop detection array LB is initialized in node F, which is apart from node A by five hops. Accordingly, even when the hash value generated in wireless communication device B and the hash value generated in wireless communication device G are identical to each other, erroneous loop decision has been avoided in wireless communication device G. In other words, erroneous decision due to false positive of a Bloom filter is suppressed.

According to one aspect of the invention, a loop in a wireless ad hoc network can be detected without increasing the amount of memory used in a wireless communication device.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A non-transitory computer-readable recording medium having stored therein a program for causing a processor in a wireless communication device to execute a wireless communication process, the wireless communication device being used in a wireless ad hoc network, the wireless communication process comprising:
   designating a bit in a loop detection array added to a received frame in accordance with identification information for identifying the wireless communication device;
   deciding that a route in which the received frame has been transmitted is not a loop when the bit designated in the loop detection array is not used and that a route in which the received frame has been transmitted is a loop when the bit designated in the loop detection array is used;
   updating the bit designated in the loop detection array to a state of being used, updating a hop count value added to the received frame and transmitting the received frame toward a destination node when it is decided that the route in which the received frame has been transmitted is not a loop; and
   returning the received frame to an adjacent node that is a local transmission source of the received frame when it is decided that the route in which the received frame has been transmitted is a loop, wherein
   the wireless communication process further includes initializing the loop detection array and the hop count value added to the received frame and transmitting the received frame in which the loop detection array and the hop count value are initialized toward the destination node, when it is decided that the route in which the received frame has been transmitted is not a loop and the hop count value added to the received frame reaches a specified number.

2. The non-transitory computer-readable recording medium according to claim 1, wherein
the designating process designates a bit in the loop detection array in accordance with identification information of the wireless communication device by using a hash function.

3. The non-transitory computer-readable recording medium according to claim 2, wherein
the designating process designates a plurality of bits in the loop detection array in accordance with identification information of the wireless communication device by using a plurality of hash functions, and
the deciding process decides that the route in which the received frame has been transmitted is a loop when all of the plurality of bits designated in the loop detection array are used.

4. A wireless communication device used in a wireless ad hoc network, the device comprising:
a processor configured to
designate a bit in a loop detection array added to a received frame in accordance with identification information for identifying the wireless communication device,
decide a route in which the received frame has been transmitted is not a loop when the bit designated in the loop detection array is not used, and decide a route in which the received frame has been transmitted is a loop when the bit designated in the loop detection array is used, and
update the bit designated by the processor in the loop detection array to a state of being used and updating a hop count value added to the received frame when it is decided that the route in which the received frame has been transmitted is not a loop; and
a transmitter configured to transmit, toward a destination node, the received frame in which the loop detection array and the hop count value are updated by the processor when it is decided that the route in which the received frame has been transmitted is not a loop, and return the received frame to an adjacent node that is a local transmission source of the received frame when it is decided that the route in which the received frame has been transmitted is a loop, wherein
when it is decided that the route in which the received frame has been transmitted is not a loop and the hop count value added to the received frame reaches a specified number, the processor initializes the loop detection array and the hop count value added to the received frame and the transmitter transmits the received frame in which the loop detection array and the hop count value are initialized toward the destination node.

5. The wireless communication device according to claim 4, wherein
the processor designates a bit in the loop detection array in accordance with identification information of the wireless communication device by using a hash function.

6. The wireless communication device according to claim 5, wherein
the processor designates a plurality of bits in the loop detection array in accordance with identification information of the wireless communication device by using a plurality of hash functions, and
the processor decides that the route in which the received frame has been transmitted is a loop when all of the designated plurality of bits in the loop detection array are used.

7. A wireless communication method executed by a wireless communication device used in a wireless ad hoc network, the method comprising:
designating a bit in a loop detection array added to a received frame in accordance with identification information for identifying the wireless communication device;
deciding that a route in which the received frame has been transmitted is not a loop when the bit designated in the loop detection array is not used;
deciding that a route in which the received frame has been transmitted is a loop when the bit designated in the loop detection array is used;
updating the bit designated in the loop detection array to a state of being used, updating a hop count value added to the received frame and transmitting the received frame toward a destination node when it is decided that the route in which the received frame has been transmitted is not a loop; and
returning the received frame to an adjacent node that is a local transmission source of the received frame when it is decided that the route in which the received frame has been transmitted is a loop, wherein
the method further includes initializing the loop detection array and the hop count value added to the received frame and transmitting the received frame in which the loop detection array and the hop count value are initialized toward the destination node, when it is decided that the route in which the received frame has been transmitted is not a loop and the hop count value added to the received frame is reaches a specified number.

* * * * *